United States Patent [19]

Park et al.

[11] Patent Number: 4,807,482

[45] Date of Patent: Feb. 28, 1989

[54] METHOD AND APPARATUS FOR MEASURING STIMULI APPLIED TO A PIEZOELECTRIC TRANSDUCER

[75] Inventors: Kyung T. Park, Upper Darby; Richard D. Klafter, Wyncote, both of Pa.

[73] Assignee: Temple University of the Commonwealth System of Higher Education, Philadelphia, Pa.

[21] Appl. No.: 51,440

[22] Filed: May 18, 1987

[51] Int. Cl.$^4$ .................................................. G01L 1/16
[52] U.S. Cl. ............................ 73/862.68; 73/DIG. 4; 374/177
[58] Field of Search ......... 73/DIG. 4, 862.67, 862.68; 310/338, 800; 374/177

[56] References Cited

U.S. PATENT DOCUMENTS

| | | | |
|---|---|---|---|
| 4,320,664 | 3/1982 | Rehn et al. | 73/708 |
| 4,512,431 | 4/1985 | Bloomfield | 177/210 R |
| 4,555,953 | 12/1985 | Dario et al. | 73/862.04 |

OTHER PUBLICATIONS

K. T. Park et al., "A Charge Readout Algorithm for Piezoelectric Force Transducers", IEEE 1986 International Symposium on the Applications of Ferroelectrics.

Primary Examiner—Charles A. Ruehl
Attorney, Agent, or Firm—Seidel, Gonda, Lavorgna & Monaco

[57] ABSTRACT

A method of and apparatus for measuring a stimulus, e.g. a force, applied to a piezoelectric transducer. The method comprises sampling the output of the transducer in response to the stimulus at intervals during application of the stimulus, resetting the output of the transducer to a predetermined value immediately following each sampling step, and summing the values of the sampled transducer output for each sampling step to provide a value indicative of the total applied stimulus. The apparatus of the invention comprises a sensor for sensing the transducer output in response to the stimulus a sampling circuit for sampling the sensed output at intervals during application of the force, a switch for resetting the output of transducer to a predetermined value immediately following each sampling operation, and circuitry for summing the values of the sampled transducer output for each sampling step and generating from them an output value indicative of the total applied stimulus.

29 Claims, 4 Drawing Sheets

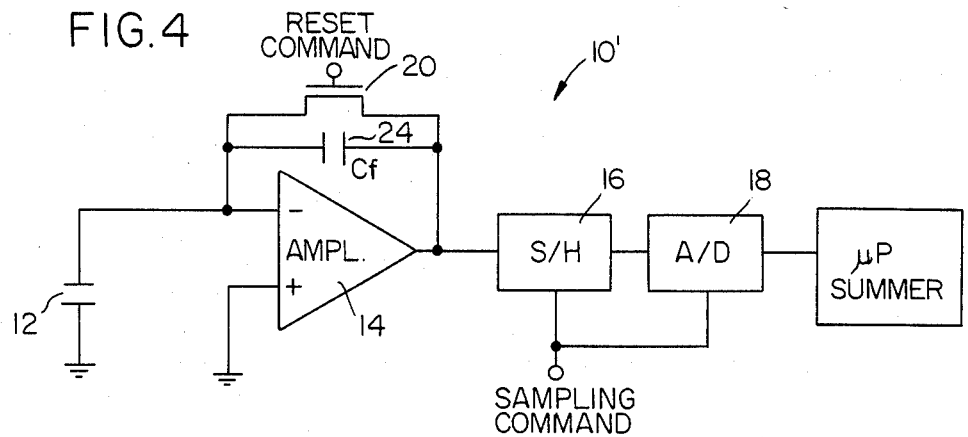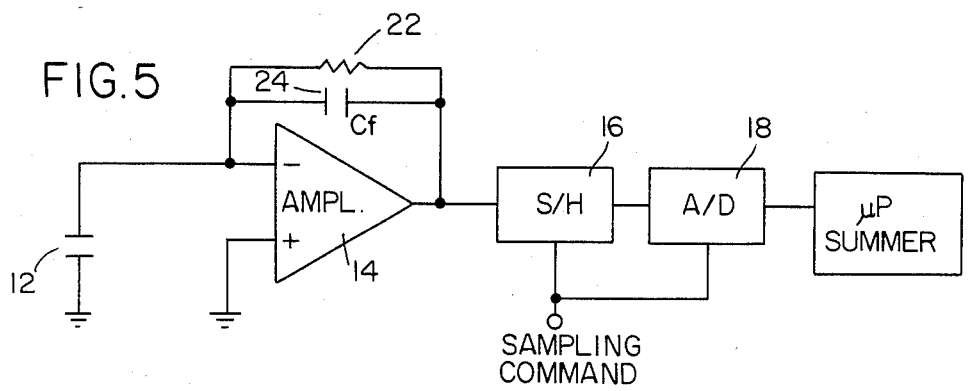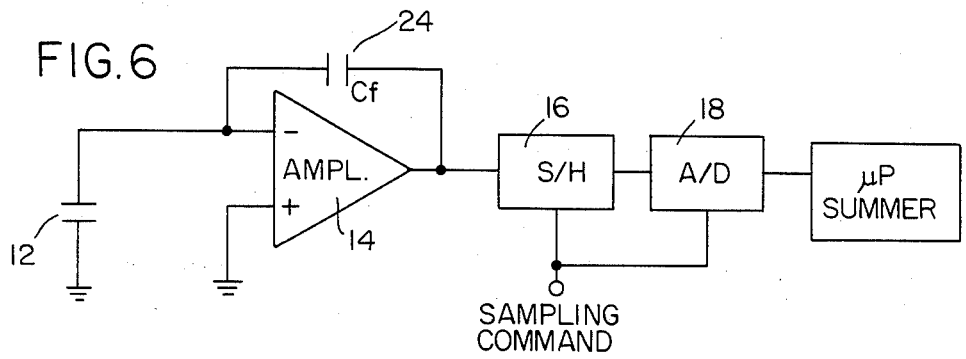

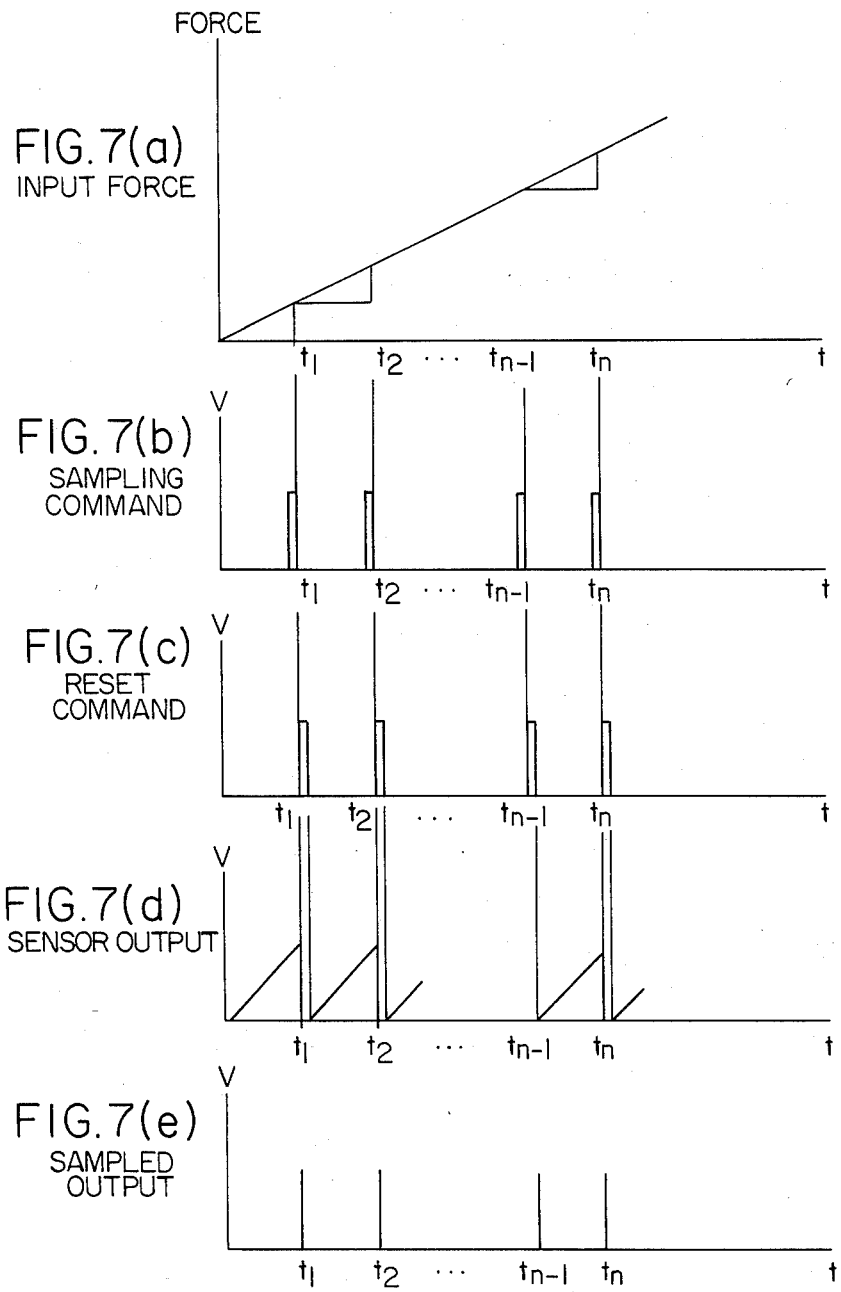

METHOD AND APPARATUS FOR MEASURING STIMULI APPLIED TO A PIEZOELECTRIC TRANSDUCER

BACKGROUND OF THE INVENTION

The present invention is directed to a novel method of and apparatus for measuring a stimulus applied to a piezoelectric transducer. In particular, the present invention improves the response of piezoelectric transducers in low frequency force measurements. The present invention enables a single piezoelectric transducer to be used for both low frequency and dynamic force measurements. In addition, the present invention permits the sensitivity and dynamic range of piezoelectric transducers to be independently increased without electrical saturation of their associated electronic interface. The present invention has advantages over conventional force transducers where the product of sensitivity and dynamic range is a constant so that sensitivity and dynamic range depend on each other.

SUMMARY OF THE INVENTION

The present invention is directed in its broad aspects to a method of measuring a stimulus applied to a piezoelectric transducer, and comprises the steps of sampling the output of the transducer in response to the stimulus at intervals during application of the stimulus, resetting the output of the transducer to a predetermined value immediately following each sampling step, and summing the values of the sampled transducer output for each sampling step to provide a value indicative of the total applied stimulus.

One particular aspect of the method of the invention comprises the steps of sampling the charge in the transducer induced by an applied force at intervals during application of the force, causing the transducer to discharge to a zero charge state immediately following each sampling step, and summing the values of the sampled charge for each sampling step to provide a charge value indicative of the total applied force.

Another aspect of the method according to the present invention comprises the steps of sampling the voltage across the transducer induced by an applied force at intervals during application of the force, resetting the voltage across the transducer to zero immediately following each sampling step, and summing the values of the sampled voltage for each sampling step to provide a voltage value indicative of the total applied force.

The invention is also in its broad terms directed to apparatus for measuring a stimulus applied to a piezoelectric transducer. The apparatus comprises sensing means for sensing the output of the transducer in response to the stimulus, sampling means operatively associated with the sensing means for sampling the sensed output at intervals during application of the stimulus, means for resetting the output of the transducer to a predetermined value immediately following each sampling operation, and means for summing the values of the sampled transducer output for each sampling step and generating therefrom an output value indicative of the total applied stimulus.

In one particular embodiment of the invention, the apparatus comprises charge sensing amplifier means for sensing the charge in the transducer induced by application of a force, sampling means operatively associated with the charge sensing amplifier means for sampling the sensed charge at intervals during application of the force, switch means for causing the transducer to discharge to a zero charge state immediately following each sampling operation, means for digitizing values of the sampled charge for each sampling operation, and means for summing the digitized values of the sam and generating therefrom a value indicative of applied force.

In a second embodiment, the apparatus comprises voltage sensing amplifier means for sensing the voltage across the transducer induced by application of a force, sampling means operatively associated with the voltage sensing means for the sensed voltage at intervals during application of the force, means for resetting the voltage across the transducer to zero immediately following each sampling operation, means for digitizing the values of the sampled volta each sampling operation, and means for summing the digitized values of the sampled voltage and therefrom a value indicative of the total applied force.

DESCRIPTION OF THE DRAWINGS

For the purpose of illustrating the invention, there is shown in the drawings a form which is presently preferred; it being understood, however, that this invention is not limited to precise arrangements and instrumentalities shown.

FIG. 4 is a simplified schematic diagram of a second embodiment of apparatus in accordance with the present invention.

FIG. 5 is a simplified equivalent circuit diagram of the circuit of FIG. 4 in the "reset" state.

FIG. 6 is a simplified equivalent circuit diagram of the circuit of FIG. 4 in the "sampling" state.

FIGS. 7(a)–7(e) are a timing diagram showing the various waveforms and signals of the circuits of FIGS. 1 and 4.

DESCRIPTION OF THE INVENTION

Piezoelectricity is the electric polarization produced by mechanical strain in certain classes of crystals. This polarization is proportional to the strain and changes sign with it. Piezoelectric materials are known to be suitable for high frequency applications such as ultrasonic transducers and accelerometers. In the past, it was thought that this type of material was unsuitable for slowly-varying force measurements because of the finite time constants of piezoelectric materials. When some of the undesirable characteristics of piezoelectric materials are overcome, however, piezoelectric materials have certain advantages as force sensing elements which are not achievable with other transduction technologies. For example, when operated properly, a piezoelectric tactile sensor that has a high sensitivity as well as a wide dynamic range is realizable. This implies that sensitivity and dynamic range can be made independent of each other. This advantage is not possible with conventional force sensing technologies where the product of sensitivity and dynamic range is a constant, i.e., sensitivity and dynamic range depend on each other.

One attractive material for piezoelectric force transduction is polyvinylidene fluoride, also called PVDF and $PVF_2$. (Throughout the remainder of this specification, the designation "PVDF" will be used.) Unlike other piezoelectric materials, such as piezoceramics and quartz, PVDF is a thin, flexible polymer film. Thus, it allows wide design choice for a tactile sensing device. As an active force-sensing material, PVDF has numerous advantages that include high sensitivity (for example, a 0.1 inch diameter and 1 mil thick piece of PVDF has a sensitivity of about 7 V/lb), good linearity and wide frequency and dynamic ranges (PVDF itself has a dynamic range of $10^4$ psi). Other advantages are good flexibility and extreme ruggedness.

On the other hand, PVDF also has some disadvantages, especially in low frequency force sensing applications. PVDF does not permit static force measurement because the developed charge decays with a time constant determined by the dielectric constant of the PVDF and the input impedance of the interface circuit. When slow motion detection is desired, this characteristic is the major disadvantage of PVDF and causes inaccurate measurement. Improvement is possible by increasing the time constant. When this is done, however, it affects the performance of the transducer. For example, a longer time constant in a charge amplifier requires a less sensitive transducer.

It is an object of the present invention to overcome this disadvantage of PVDF as a low frequency force transducer.

Figure 1:
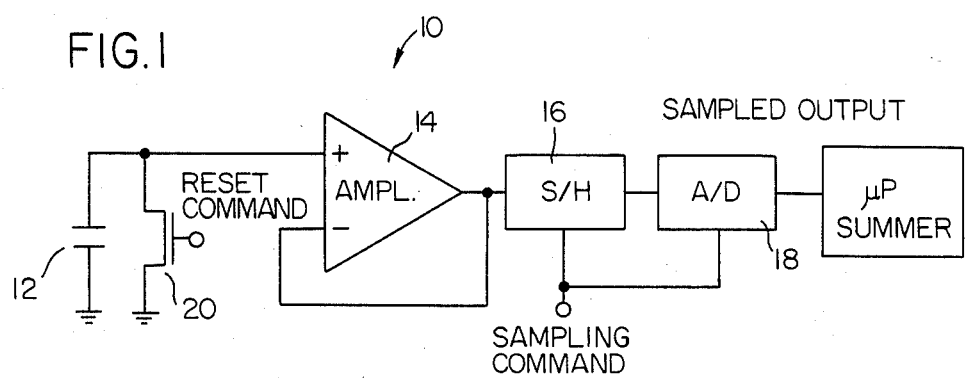
FIG. 1 is a simplified schematic diagram of one embodiment of apparatus according to the present invention.

Referring now to the drawings, wherein like numerals indicate like elements, there is shown in FIG. 1 one form of apparatus in accordance with the present invention which permits utilization of PVDF piezoelectric polymer as an effective force sensing material over a wide frequency range including low frequencies. The apparatus is preferably implemented in the form of an electronic circuit 10 which samples the voltage induced across a piezoelectric transducer at intervals, resets the voltage across the transducer to zero immediately following each sampling operation, and then digitizes and sums individual samples. The circuit 10 is particularly suitable for force transducers such as PVDF which exhibit a response that depends on the rate of applied force rather than the absolute force.

In the Figures, a PVDF transducer is designated generally by reference numeral 12, and is modeled as a capacitor whose charge, and thus voltage, is proportional to the stimulus, usually a force, applied to the transducer. Although force is used as the stimulus for purposes of illustration, the stimulus may also include an electric field, thermal energy, and other stimuli to which PVDF is responsive.

Induced voltage across transducer 12 is sensed by voltage following amplifier 14 which, in the illustrated embodiment, is a conventional operational amplifier connected in voltage follower configuration. The output of amplifier 14, which, as will be understood by those skilled in the art, follows the input voltage, is connected to a conventional sample and hold circuit 16 which samples the output voltage of amplifier 14 at intervals during application of the force. The intervals may be periodic or variable, and may be varied adaptively during the course of a measurement. The output of sample and hold circuit 16, which is analog in nature, can be digitized by A/D converter 18 and from thee sent to s suitably-programmed microprocessor for summing, as will be explained in detail below.

A reset switch 20 is connected across transducer 12 for resetting the output of the transducer to a predetermined value immediately following each sampling operation. Although reset switch 20 is illustrated as an electronic switch, any other form of switch, such as a mechanical switch, may be used. A mechanical switch has the advantage of extremely small on resistance, but is limited in operating speed. As an electronic switch, a CMOS or JFET device can be used. These allow higher sampling rates, but exhibit switching noise due to the gate-channel capacitance.

By activating (i.e., closing) switch 20 at intervals, the voltage across transducer 12 can be shorted to zero. Although the reset switch is illustrated at resetting the voltage across the transducer to zero, i.e., ground, reset switch 20 can be connected to any other suitable predetermined voltage if desired.

FIG. 4 illustrates an alternate embodiment of an electronic circuit 10', which, instead of voltage, senses the charge induced in the transducer 12 as a result of applied force. Charge induced in transducer 12 is sensed by an integrator circuit comprising operational amplifier 14 and feedback capacitor 24, connected in the well-known integrator configuration. As with the circuit of FIG. 1, the output of charge sensing amplifier 14 is connected to a sample and hold circuit 16. The output of sample and hold circuit 16 may be digitized by A/D converter 18, and from there sent a microprocessor for summing.

The charge induced in transducer 12 by the applied force is reset switch 20, which is connected in parallel with feedback capacitor 24. By actuating (i.e., closing) reset switch 20 at intervals the charge induced in transducer 12 can be reset to zero.

Figure 2:
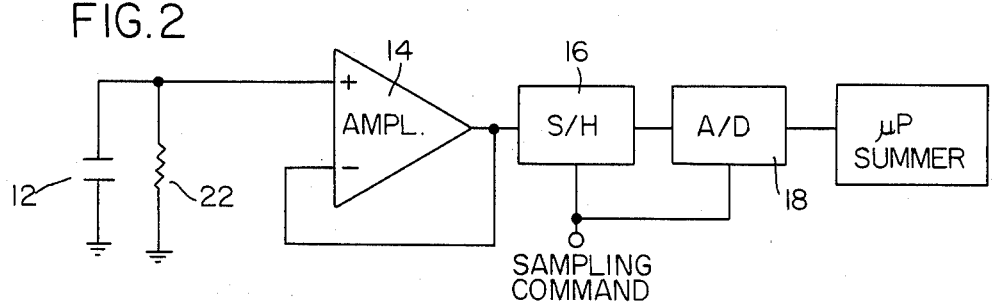
FIG. 2 is a simplified equivalent circuit diagram of the circuit of FIG. 1 in the "reset" state.
Figure 3:
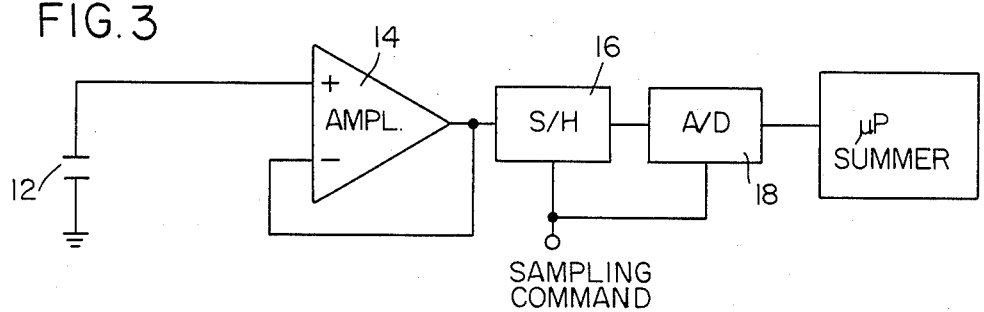
FIG. 3 is a simplified equivalent circuit diagram of the circuit of FIG. 1 in the "sampling" state.

Operation of circuits 10 and 10', for a monotonically increasing applied force, will now be described, with reference to FIGS. 1–7(e). The voltage follower circuit of FIGS. 1–3 is described first.

As noted above, in response to an applied force, transducer 12 will develop a voltage proportional to the applied force. Assuming a monotonically increasing applied force, as shown FIG. 7(a), the voltage across transducer 12 will also increase monotonically. Thus, the output of voltage follower amplifier 14 will be a monotonically increasing voltage. In other words, the amplifier output voltage follows the applied force change, as shown in FIG. 7(d).

The output voltage of amplifier 14 is sampled at intervals T1, T2, . . . , $T_n$ by sample and hold circuit 16 in response to sampling commands illustrated in FIG. 7(b). During sampling, the reset switch 20 is open. Therefore, for a monotonically increasing applied force, the applied input force change during the sampling interval is indicated by the amplitude of the sampled output of amplifier 14, which is inversely proportional to the sampling rate.

After the sensor output is sampled, a reset command, illustrated in FIG. 7(c), immediately resets the voltage across transducer 12 to zero by closing reset switch 20. When reset switch 20 is closed, it can be considered a resistor 22, as shown in FIG. 2. Resistor 22 generally has a value of between 10 ohms and 300 ohms for CMOS and JFET switches. As shown in FIG. 2, both electrodes of transducer 12 are directly shorted to ground through resistor 22, so that the output of amplifier 14 becomes grounded, or zero volts. Therefore, the reset command pulse forces the sensor output to be at ground level, as shown in FIG. 7(d).

Since no charge is observable during this reset command, even though a force is being applied, the width of the reset command pulse must be short to minimize errors. The minimum pulse width can be obtained from the discharge time constant for the transducer 12 and resistor 22. That is, the reset pulse width must be greater than the product of resistance 22 and the capacitance of transducer 12. As a numerical example, an 85 mil diameter and 1 mil thick cylindrical PVDF sensing element has 16 pF capacitance. Then, by assuming unity amplification in voltage follower amplifier 14 and 60 ohms for the on resistance 22 of reset switch 20, the minimum pulse width for a reset command is:

$$T_{reset} > 60 \times 16 \times 10^{-12} = 0.96 \text{ ns}$$

Therefore, a few nanosecond reset command is enough to reset the voltage across transducer 12. With this value, the measurement error introduced by the reset operation is negligible.

As illustrated in FIGS. 7(a)-7(b), the sampling and reset operations are performed at intervals over the time period for which it is desired to measure the applied force. The amplitudes of the sampled output signals, FIG. 7(e), may be summed in analog fashion, or in a microprocessor after first being digitized in A/D converter 18, to provide a value indicative of the total value of the applied force.

Operation of circuit 10' is similar to operation of circuit 10, except that circuit 10' senses the induced charge in transducer 12, instead of sensing induced voltage. In the sampling mode, reset switch 20 is open, and circuit 10' appears as a conventional integrator, as shown in FIG. 6. The charge induced in transducer 12 is proportional to the rate of change of applied force. Thus, by integrating the sensed charge, the output of amplifier 14 is a monotonically increasing voltage which follows the monotonically increasing applied force, as shown in FIG. 7(d) and 7(a). Thus, as with circuit 10, the output voltage of amplifier 14 follows the applied force. The output voltage of amplifier 14 is sampled at intervals T1, T2, ..., $T_n$, as with circuit 10.

Transducer 12 is brought to a zero charge state immediately after each sampling command by closing reset switch 20 in response to reset command pulses, shown in FIG. 7(c). As shown in FIG. 5, in the closed state, reset switch 20 can be replaced by a resistance 22. In this state, the charge developed on transducer 12 is transferred to the feedback capacitance 24 and is discharged through resistance 22 in a finite time. Since the negative input terminal of operational amplifier 14 is at virtual ground, the amplifier output is effectively at ground. Therefore, the reset command pulse forces the transducer and feedback capacitance to be discharged, forcing the sensor output to be at ground level, as shown in FIG. 7(d).

For circuit 10', the minimum pulse width for the reset command pulses is obtained from the discharge time constant of resistance 22 and feedback capacitance 24.

The sampled output of circuit 10' indicates the force change during the sampling period, as with circuit 10. Therefore, the summation of the sampled outputs indicates the summation of changes of the applied force, i.e., the current total value of the applied force. As with circuit 10, the sampled outputs of circuit 10' can be summed, either in analog fashion or in a microprocessor after digitizing, to provide total applied force.

The present invention offers a number of advantages over conventional force transduction. Offset calibration is not needed, since the reset operation clears the initial charge resulting from any initial condition (e.g., initially applied force on the transducer), and thus zero offset calibration can be omitted.

In addition, both sensitivity and dynamic range of the transducer can be independently increased. With conventional force transduction, the product of sensitivity and dynamic range becomes a constant which depends on the saturation voltage of the electronic interface circuitry. In order to increase the sensitivity, therefore, the dynamic range must be reduced and vice versa. With the present invention, however, electrical saturation of the interface electronics can be avoided by the repeated sampling and reset operation so that the sensitivity and dynamic range become independent of each other. Because of the reset operation, applied input force can be measured over a wide dynamic range even though the developed electrical output of the transducer 12 would exceed the saturation voltage of amplifier 14.

Figure 8:
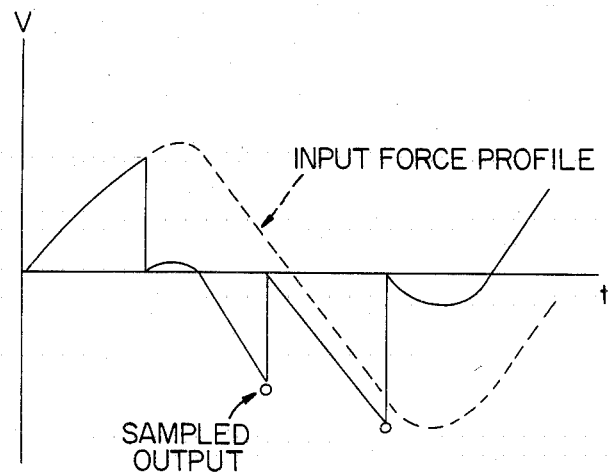
FIG. 8 illustrates the sampling and reset operation of the present invention for a nonmonotonic input signal.

Still further, peak force time can be easily determined. Since circuits 10 and 10' operate as the equivalent of a differentiator, the peak time can be determined by detecting the change of sign of the sampled output. This is illustrated in FIG. 8, where the input force in non-monotonic.

Most importantly, however, the present invention makes static and low frequency force measurement possible. The present invention minimizes the effect of charge decay in the transducer at low frequencies. By adjusting the sampling rate, the performance of the circuits according to the present invention can be improved for various time constants of a given transducer. For example, when a 100 Hz sampling rate is employed with a piezoelectric transducer having a one second time constant, the measurement error due to its charge decay becomes less than 0.5% and is independent of the measuring time.

It will thus be appreciated that charge decay due to the finite time constant of a piezoelectric can be minimized or eliminated by the present invention. The electrical output of a piezoelectric transducer thus becomes independent of the measuring time. This permits a piezoelectric transducer to be used for both low frequency and dynamic force measurements. The invention also permits sensitivity and dynamic range to be increased independently. The major parameter that determines the performance of the present invention is the sampling rate, which may be selected in order to meet desired application requirements.

The present invention may be embodied in other specific forms without departing from the spirit or essential attributes thereof and, accordingly, reference should be made to the appended claims, rather than to the foregoing specification, as indicating the scope of the invention.

We claim:

1. Method of measuring a stimulus applied to a piezoelectric transducer comprising the steps of:
   (a) sampling the output of the transducer in response to the stimulus at intervals during application of the stimulus, (b) resetting the output of the transducer to a predetermined value immediately following each sampling step, and (c) summing the values of the sampled transducer output for each sampling step to provide a value indicative of the total applied stimulus.

2. Method according to claim 1, wherein the applied stimulus is a force.

3. Method according to claim 1, wherein the applied stimulus is an electromagnetic field.

4. Method according to claim 1, wherein the applied stimulus is thermal energy.

5. Method according to claim 1, wherein the intervals are periodic.

6. Method according to claim 1, wherein the predetermined reset value is zero.

7. Method of measuring a force applied to a piezoelectric transducer, comprising the steps of:

(a) sampling the charge in the transducer induced by the applied force at intervals during application of the force, (b) causing the transducer to discharge to a zero charge state immediately following each sampling step, and (c) summing the values of the sampled charge for each sampling step to provide a charge value indicative of the total applied force.

8. Method of measuring a force applied to a piezoelectric transducer comprising the steps of:

(a) sampling the voltage across the transducer induced by the applied force at intervals during application of the force, (b) resetting the voltage across the transducer to zero immediately following each sampling step, and (c) summing the values of the sampled voltage for each sampling step to provide a voltage value indicative of the total applied force.

9. Apparatus for measuring a stimulus applied to a piezoelectric transducer, comprising:

(a) sensing means for sensing the output of the transducer in response to the stimulus, (b) sampling means operatively associated with the sensing means for sampling the sensed output at intervals during application of the stimulus, (c) means for resetting the output of the transducer to a predetermined value immediately following each sampling operation, and (d) means for summing the values of the sampled transducer output for each sampling step and generating therefrom an output value indicative of the total applied stimulus.

10. Apparatus according to claim 9, wherein the applied stimulus is a force.

11. Apparatus according to claim 9, wherein the applied stimulus is an electromagnetic field.

12. Apparatus according to claim 9, wherein the applied stimulus is thermal energy.

13. Apparatus according to claim 9, wherein the sensing means comprises an operational amplifier.

14. Apparatus according to claim 9, wherein the means for resetting comprises switch means.

15. Apparatus according to claim 14, wherein the switch means is an electronic switch means.

16. Apparatus according to claim 9, further comprising means for digitizing the values of the sampled transducer output intermediate the sampling means and means for summing.

17. Apparatus according to claim 16, wherein the means for summing comprises microprocessor means.

18. Apparatus according to claim 9, wherein the transducer comprises a polyvinylidene polymer.

19. Apparatus for measuring a force applied to a piezoelectric transducer, comprising:

(a) charge sensing amplifier means for sensing the charge in the transducer induced by application of the force, (b) sampling means operatively associated with the charge sensing amplifier means for sampling the sensed charge at intervals during application of the force, (c) switch means for causing the transducer to discharge to a zero charge state immediately following each sampling operation, (d) means for digitizing the values of the sampled charge for each sampling operation, and (e) means for summing the digitized values of the sampled charge and generating therefrom a value indicative of the total applied force.

20. Apparatus according to claim 19, wherein the charge sensing amplifier means comprises an operational amplifier.

21. Apparatus according to claim 19, wherein the switch means is an electronic switch means.

22. Apparatus according to claim 21, wherein the means for summing comprises microprocessor means.

23. Apparatus according to claim 19, wherein the transducer comprises a polyvinylidene polymer.

24. Apparatus for measuring a force applied to a piezoelectric transducer, comprising:

(a) voltage sensing amplifier means for sensing the voltage across the transducer induced by application of the force, (b) sampling means operatively associated with the voltage sensing means for sampling the sensed voltage at intervals during application of the force, (c) means for resetting the voltage across the transducer to zero immediately following each sampling operation, (d) means for digitizing the values of the sampled voltage for each sampling operation, and (e) means for summing the digitized values of the sampled voltage and generating therefrom a value indicative of the total applied force.

25. Apparatus according to claim 24, wherein the voltage sensing amplifier means comprises an operational amplifier.

26. Apparatus according to claim 24, wherein the means resetting comprises switch means.

27. Apparatus according to claim 26, wherein the switch means comprises an electronic switch means.

28. Apparatus according to claim 24, wherein the means for summing comprises microprocessor means.

29. Apparatus according to claim 24, wherein the transducer comprises a polyvinylidene polymer.

* * * * *